(12) United States Patent
Kozera

(10) Patent No.: US 7,594,458 B2
(45) Date of Patent: Sep. 29, 2009

(54) STACKING SYSTEM, SKID, AND METHOD OF ASSEMBLING THE SKID

(76) Inventor: Stanislaw J. Kozera, 6144 Cronin, Dearborn Heights, MI (US) 48127

( * ) Notice: Subject to any disclaimer, the term of this patent is extended or adjusted under 35 U.S.C. 154(b) by 471 days.

(21) Appl. No.: 11/483,392

(22) Filed: Jul. 7, 2006

(65) Prior Publication Data
US 2007/0012149 A1    Jan. 18, 2007

Related U.S. Application Data

(63) Continuation-in-part of application No. 10/872,328, filed on Jun. 18, 2004, now abandoned.

(51) Int. Cl.
*B26D 7/06* (2006.01)
(52) U.S. Cl. ............... 83/86; 83/29; 83/94; 248/346.02
(58) Field of Classification Search ............ 248/346.02; 83/29, 84, 86, 87, 88, 89, 91, 94; 271/3.02, 271/207
See application file for complete search history.

(56) References Cited

U.S. PATENT DOCUMENTS

| | | | |
|---|---|---|---|
| 1,107,859 A | 8/1914 | Stevens | |
| 1,432,086 A | 10/1922 | Plonka | |
| 1,565,840 A | 12/1925 | Wise | |
| 2,585,076 A | 2/1952 | Bandura et al. | |
| 3,313,191 A * | 4/1967 | Zakroff et al. | 83/89 |
| 3,392,892 A | 7/1968 | Rainbow et al. | |
| 3,439,605 A | 4/1969 | Hanley | |
| 3,556,326 A | 1/1971 | Cline | |
| 3,668,958 A * | 6/1972 | Kinsey | 83/88 |
| 3,935,769 A * | 2/1976 | Obenshain | 83/79 |
| 3,983,799 A | 10/1976 | Paul | |
| 4,034,636 A * | 7/1977 | Pearl | 83/401 |
| 4,084,495 A | 4/1978 | Paul | |
| 4,091,945 A | 5/1978 | Patterson | |
| 4,220,431 A | 9/1980 | Place et al. | |
| 4,500,001 A | 2/1985 | Daniels | |
| 4,674,375 A * | 6/1987 | Golicz | 83/91 |
| 4,777,783 A | 10/1988 | Zald | |
| 6,006,638 A | 12/1999 | Eltringham | |
| 6,099,452 A | 8/2000 | Hoza et al. | |

(Continued)

*Primary Examiner*—J. Allen Shriver, II
*Assistant Examiner*—Bradley H Duckworth
(74) *Attorney, Agent, or Firm*—Cantor Colburn LLP.

(57) ABSTRACT

A skid for supporting stackable workpieces is provided. The skid includes a first and a second support member and a first and a second connecting member. The first and second support members extend in a first direction in a substantially parallel spaced relationship with respect to one another. Each support member includes a base member and a plurality of extension members extending from the base member, wherein a length of the first support base member and the second support base member is greater than a width between a pair of side guides of a stacking system. The extension members are configured to support stackable workpieces thereon. Each connecting member extends in a second direction substantially perpendicular to the first direction. Each connecting member has an end portion disposed on the base member of the first support member between extension members. The other end portion of each connecting member is disposed on the base member of the second support member between extension members. The first and second support members are movable relative to one another while being guided by the first and second connecting members.

19 Claims, 16 Drawing Sheets

U.S. PATENT DOCUMENTS 6,135,445 A * 10/2000 Gamperling et al. ........ 271/220
2003/0189153 A1 * 10/2003 Nakabayashi et al. .. 248/346.02
2005/0016344 A1 * 1/2005 Kozera .......................... 83/84

* cited by examiner

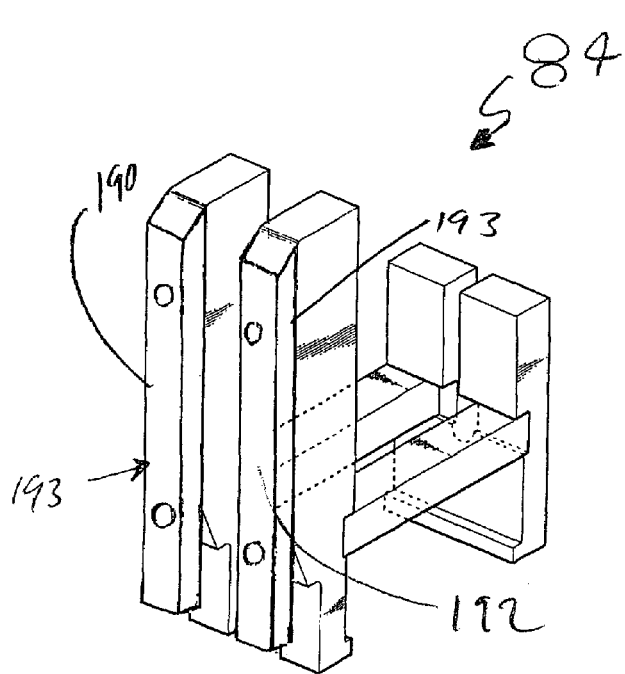
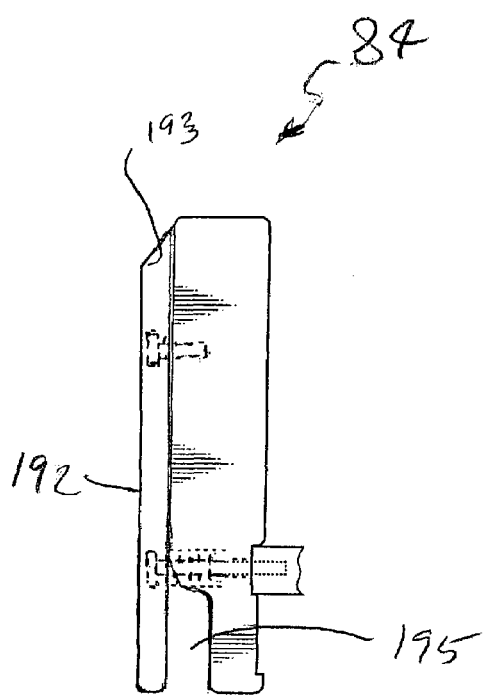
Figure 8A
Figure 8B

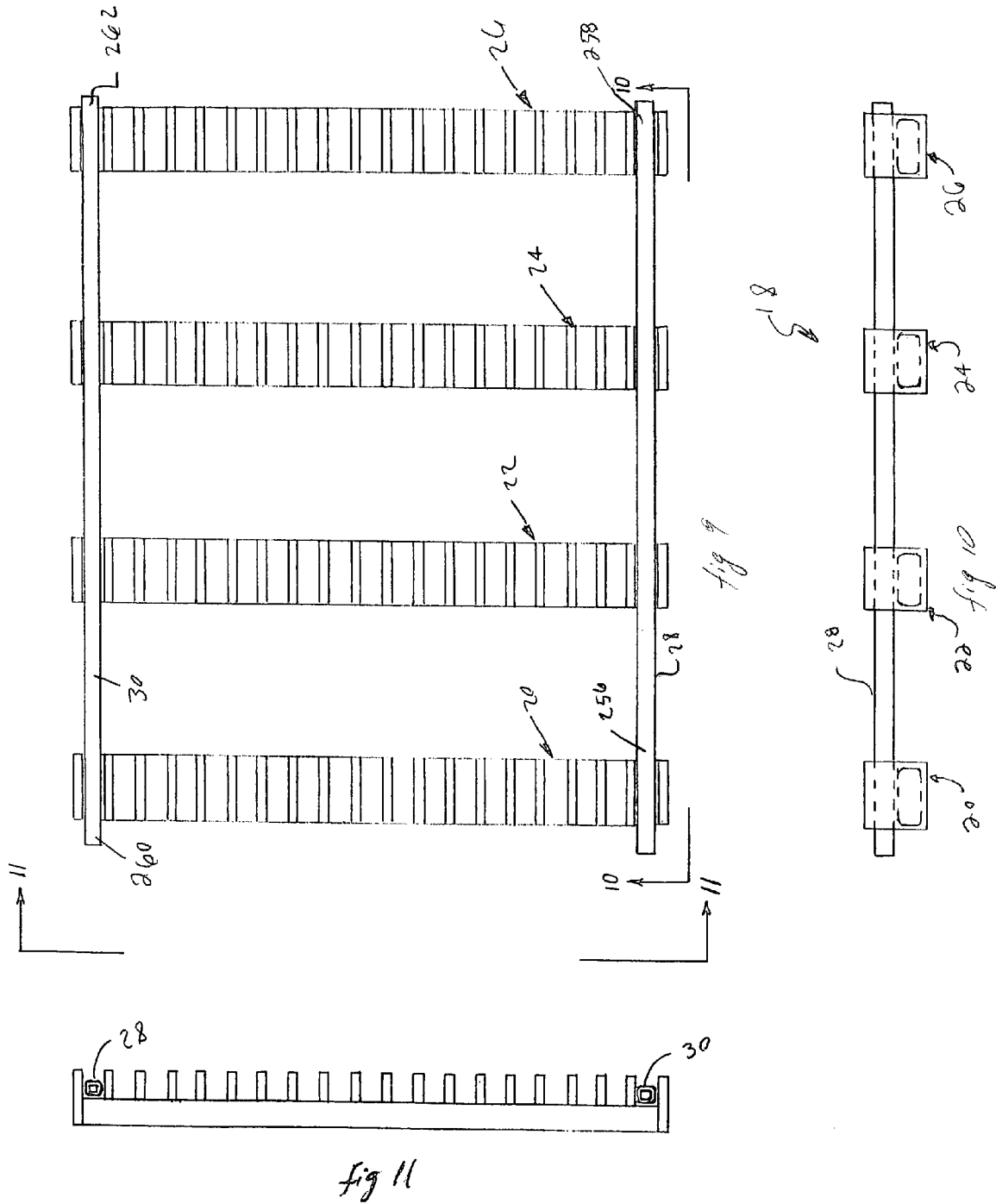

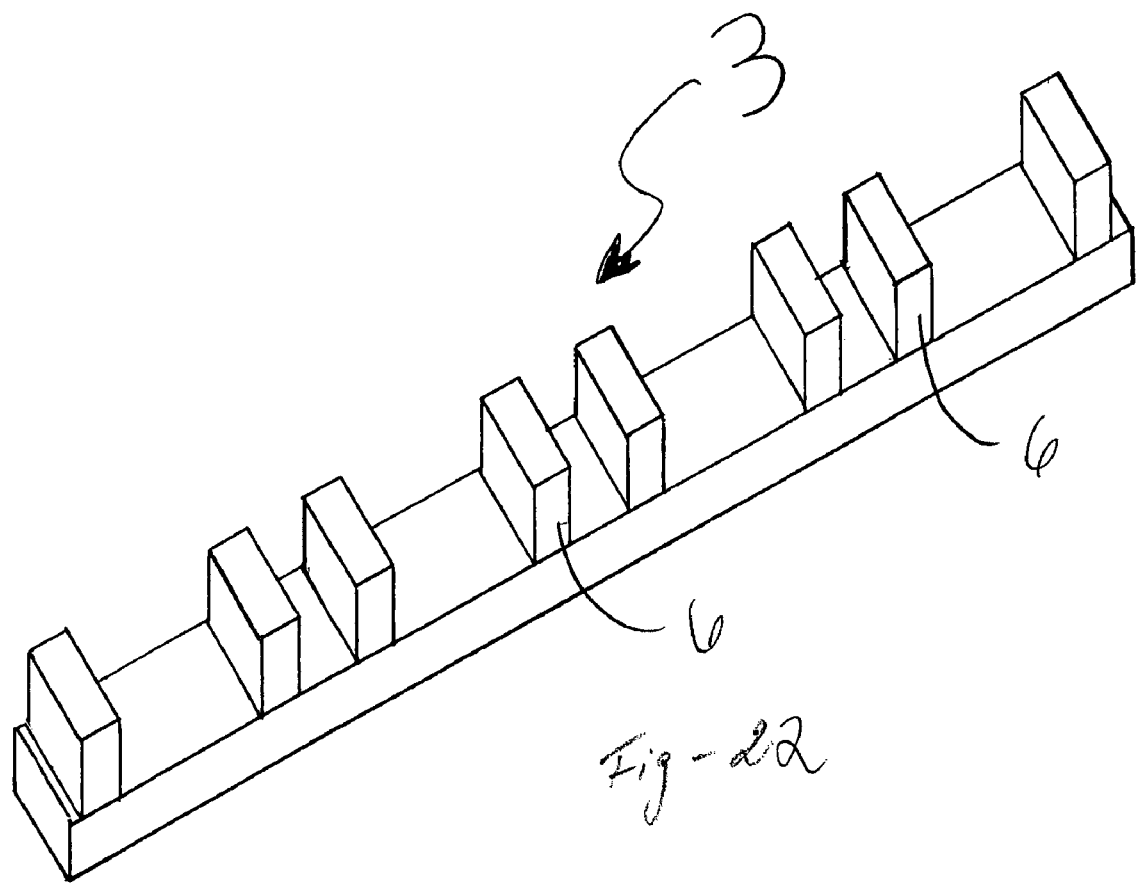

STACKING SYSTEM, SKID, AND METHOD OF ASSEMBLING THE SKID

CROSS-REFERENCE TO RELATED APPLICATIONS

The present application is a continuation-in-part application of and claims priority to U.S. patent application Ser. No. 10/872,328, filed Jun. 18, 2004, now abandoned the contents of which are incorporated herein by reference thereto.

TECHNICAL FIELD

This application relates to a stacking system, a universal skid for use with the stacking system, and a method of assembling the universal skid.

BACKGROUND

Blanking machines have been developed to sever a large roll of metal sheet into several smaller flat sheets. Typically, the severed sheets are urged to a stacking mechanism that guides and stacks the sheets on a pallet disposed below the stacking mechanism.

The conventional pallet configuration is often a rectangular shaped pallet having a fixed-sized area for receiving metal sheets that have substantially the same size as the pallet. A drawback with this pallet configuration is that the area of the pallet for receiving sheets cannot be adjusted. As a result, when metal sheets having a plurality of different sizes are received, a plurality of pallets having different sizes are utilized for holding the sheets thereon.

For example, and referring to FIGS. 20-22, a special chain conveyor 1 has a plurality of 2×4s or other equivalent members 2 positioned in a transverse direction to the chains, thereafter a plurality of specially cut base members 3 are placed on the chain conveyor in a transverse direction to the 2×4s. The base members are configured to be received within the side guides 4 of the stacker. The base members are also configured to allow dividers 5 to pass therethrough when the base members are raised in between the side guides. Since the whole structure (2×4s and base members) is moved to the stacker center by the chain conveyor and/or other mechanical devices. The movement of this structure causes the base members to move and therefore their alignment to each other and ultimately the dividers is changed as they are not secured to each other and therefore they must be replaced to an orientation that aligns the base members up with the dividers of the stacking system such that when the pallet is lifted up towards the dividers, the same are allowed to pass between studs or extended members 6 of the base member comprising the pallet. These extended members are required to be placed between the dividers and side guides so that the base member and 2×4s are positioned to receive the cut pieces of metal 7 passing through the dividers.

As can be seen in FIGS. 20-22, the width of the placement of the dividers corresponds to the width of the metal being cut, which in turn requires the extended members or studs of the base members to be orientated as in FIG. 20 such that the extended members can pass between the dividers and the side guides of the stacker. Since the chain conveyor is raised up by a scissor lift or other equivalent device, a miss-alignment of just one of the base members may cause one of the studs to contact one of the side guides or dividers causing the operator to lower the lift and realign the base members in order to have the desired position illustrated in FIG. 20. This continuous alignment of base member adds time and cost to the stacking process. Moreover, and should one of the studs contact the divider this contact may bend or break the divider.

In addition, and as the width of the metal members varies so does the placement of the dividers (e.g., dividers are adjustable within side guides). Accordingly, various placements of the dividers are capable for multiple sized orders. In order to compensate for these various sized orders the configuration of the base members and the stud placement must also vary thus, a great amount of differently sized base members is required for use with a stacker system.

Accordingly, it is desirable to provide a pallet or skid for use with a stacker system wherein the receiving area is capable of receiving loads of varying sizes from a stacking system.

SUMMARY OF THE INVENTION

A skid for supporting stackable work pieces is provided, the skid comprising: at least a first support member and a second support member extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, the first and second plurality of extension members being configured to support work pieces thereon, wherein a length of the first support member and the second support base member is greater than a width between a pair of side guides of a stacking system; and at least a first and a second connecting member extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members; the first and second support members being movable relative to one another in the second direction while being guided by the first and second connecting members, wherein the first and second support members are configured to provide a universal receiving surface for use with a stacking system capable of providing items to be received on the receiving surface which vary in size.

A method of assembling a skid for supporting stackable work pieces, the skid having at least a first and a second support member and at least a first and a second connecting member, the first support member having a first base member and a first plurality of extension members extending from a first surface of the first base member, the second support member having a second base member and a second plurality of extension members extending from a second surface of the second base member, the first connecting member having first and second end portions, the second connecting member having third and fourth end portions, wherein a length of the first support member and the second support base member is greater than a width between a pair of side guides of a stacking system the method comprising: positioning the first and second support members in a substantially parallel spaced relationship with respect to one another; disposing the first end portion of the first connecting member on the first surface of the first base member between adjacent extension members of the first plurality of extension members; disposing the second end portion of the first connecting member on the second surface of the second base member between adjacent extension members of the second plurality of extension members; disposing the third end portion of the second connecting member on the first surface of the first base member between adjacent extension members of the first plurality of extension members; and disposing the fourth end portion of the second connecting member on the second surface of the second base member between adjacent extension members of the second plurality of extension members, wherein the first and second support members are configured to provide a universal receiving surface for use with a stacking system capable of providing items to be received on the receiving surface which vary in size.

A stacking system for stacking work pieces, comprising: a stacking mechanism configured to guide stackable work pieces, the stacking mechanism having a top guide configured to align a front edge of the work pieces, a pair side guides and a plurality of adjustable dividers disposed between the pair of side guides, the side guide and plurality of dividers defining area corresponding to a dimension of the stackable work pieces; and a universal skid configured to be disposed beneath the stacking mechanism, the skid being configured for receiving the stackable work pieces from the stacking mechanism, the skid having at least a first and a second support member and at least a first and a second connecting member, the first and second support members extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, the first and second plurality of extension members being configured to support stackable work pieces thereon, the first and second connecting members extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members, the first and second support members being movable relative to one another in the second direction while being guided by the first and second connecting members, wherein a length of the first support member and the second support base member is greater than a width between the pair of side guides of the stacking mechanism, wherein the first and second support members are configured to provide a universal receiving surface for use with the stacking system and wherein the first and second support members will make contact with a lower surface of the side guides thereby preventing the first and second support members from contacting or damaging the dividers.

A stacking system for stacking work pieces, comprising: a stacking mechanism configured to guide stackable work pieces, the stacking mechanism having a pair of side guides, each being configured to align a side edge of the work pieces; and a skid disposed beneath the stacking mechanism, the skid being configured for receiving the stackable work pieces from the stacking mechanism, the skid having at least a first and a second support member and at least a first and a second connecting member, the first and second support members extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, the first and second plurality of extension members being configured to support stackable work pieces thereon, the first and second connecting members extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members, the first and second support members being movable relative to one another in the second direction while being guided by the first and second connecting members and wherein a length of the first support member and the second support base member is greater than a width between the pair of side guides of the stacking system.

A stacking system for stacking work pieces, comprising: a stacking mechanism configured to guide stackable work pieces, the stacking mechanism having a backstop member configured to align an edge of the work pieces; and a skid disposed beneath the stacking mechanism, the skid being configured for receiving the stackable work pieces from the stacking mechanism, the skid having at least a first and a second support member and at least a first and a second connecting member, the first and second support members extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, wherein a length of the first support base member and the second support base member is greater than a width between a pair of side guides of the stacking system the first and second plurality of extension members being configured to support stackable work pieces thereon, the first and second connecting members extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members, the first and second support members being movable relative to one another in the second direction while being guided by the first and second connecting members.

BRIEF DESCRIPTION OF THE DRAWINGS

FIGS. 8-8B are perspective views of backstop members utilized in the stacking system of FIG. 1;

FIG. 9 is a top view of a skid utilized in the stacking system of FIG. 1 in accordance with an exemplary embodiment;

FIG. 10 is a side view of the skid of FIG. 9 along lines 10-10;

FIG. 11 is a side view of the skid of FIG. 9 along lines 11-11;

FIGS. 20-22 are views of prior devices and methods used with stacker systems.

DETAILED DESCRIPTION OF EXEMPLARY EMBODIMENTS

Figure 18:
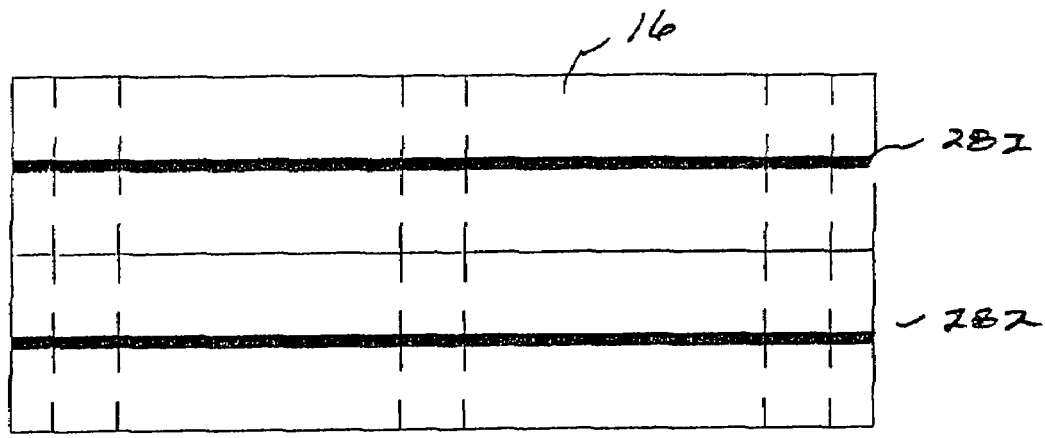
FIG. 18 is a top view of a plurality of sheets banded together in the longitudinal direction.
Figure 19:
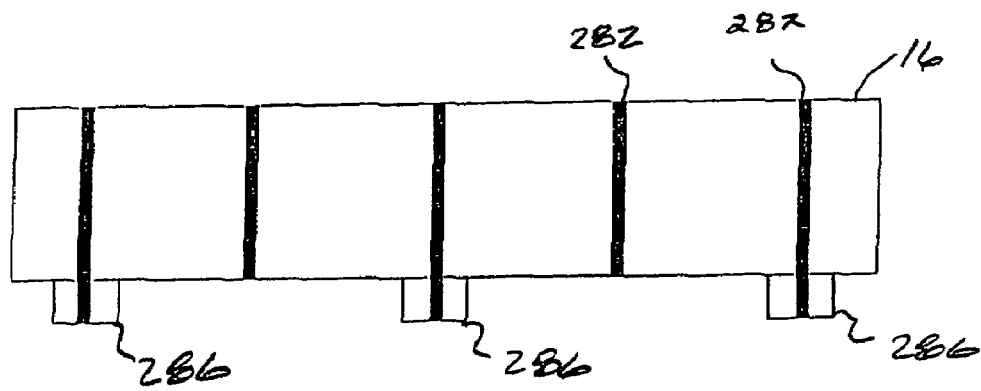
FIG. 19 is a side view of a plurality of sheets banded together in the transverse direction.
Figure 20:
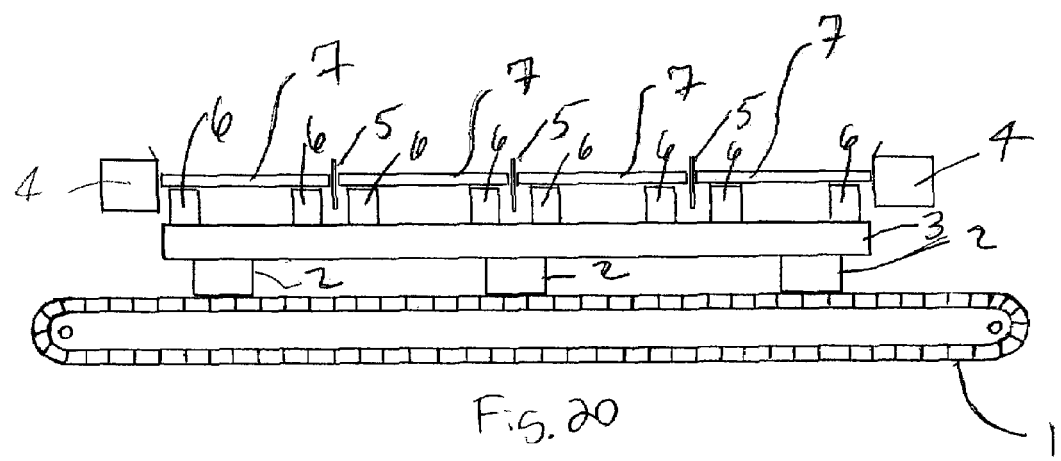
Figure 21:
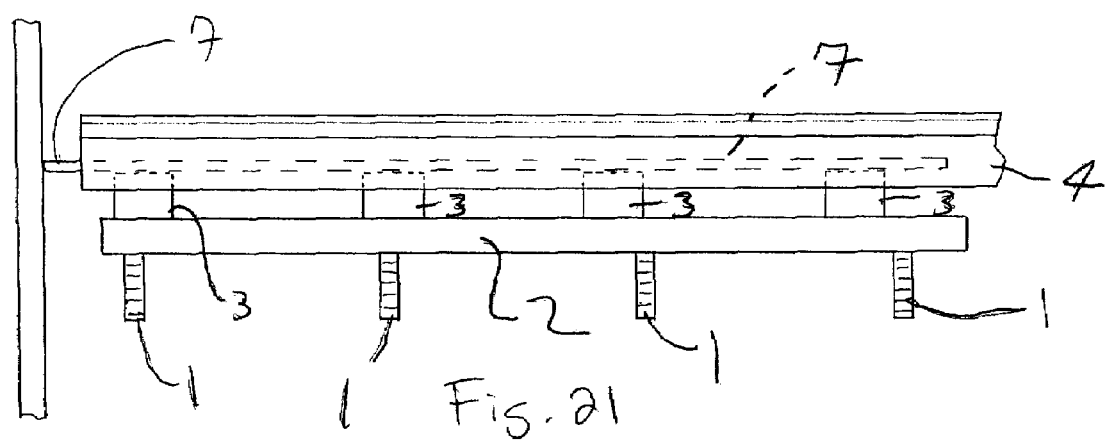

In accordance with an exemplary embodiment, the stacking system is capable of being used with all kinds of orders when different widths of cut metal sheets are provided and the customer requires a bundle of cut blanks to be put on a skid member in accordance with an exemplary embodiment of the present invention (See FIGS. 18-19).

Figure 1:
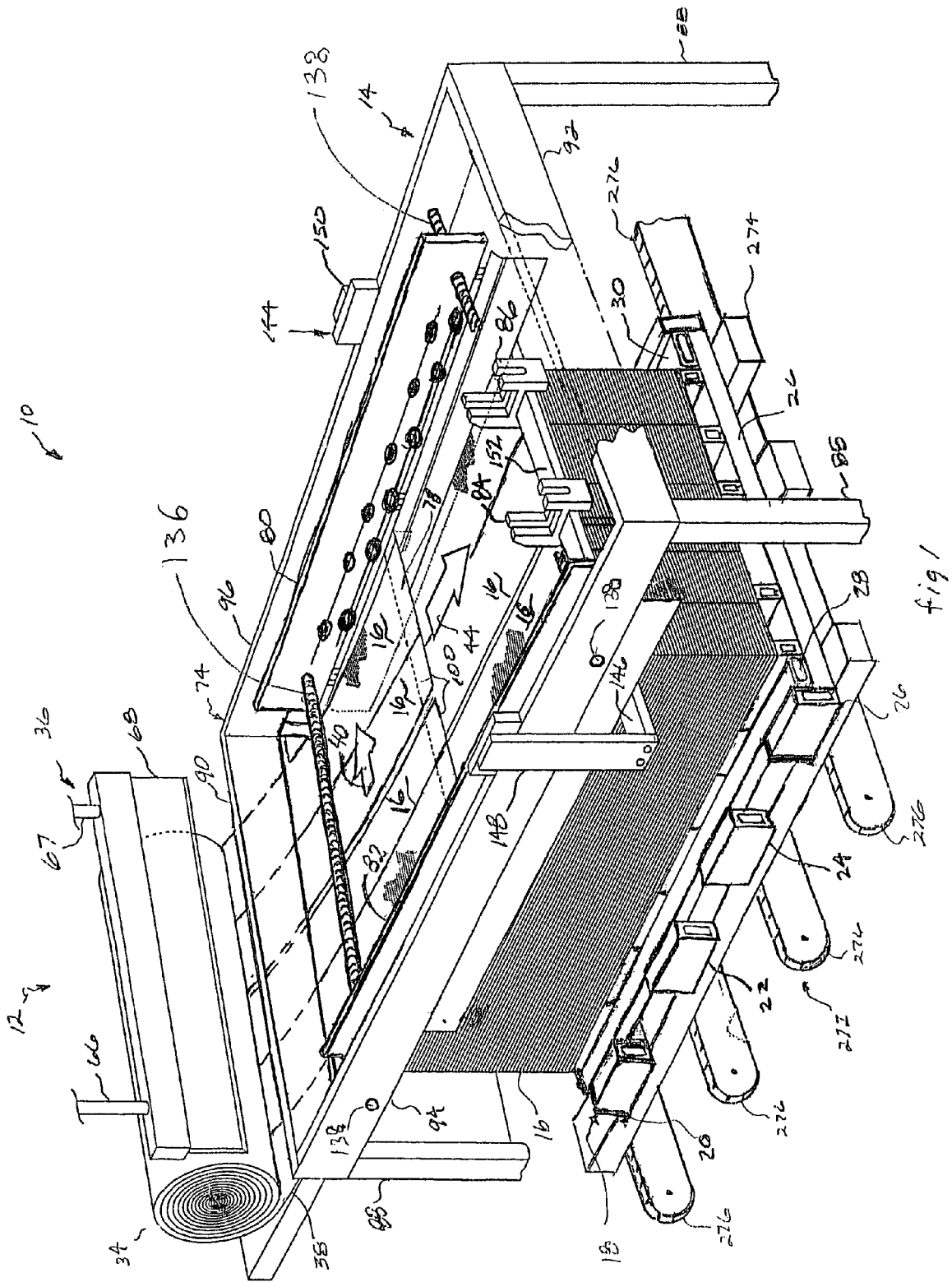
FIG. 1 is a perspective view of a stacking system having a blanking machine, a stacking mechanism, and a skid in accordance with an exemplary embodiment.
Figure 2:
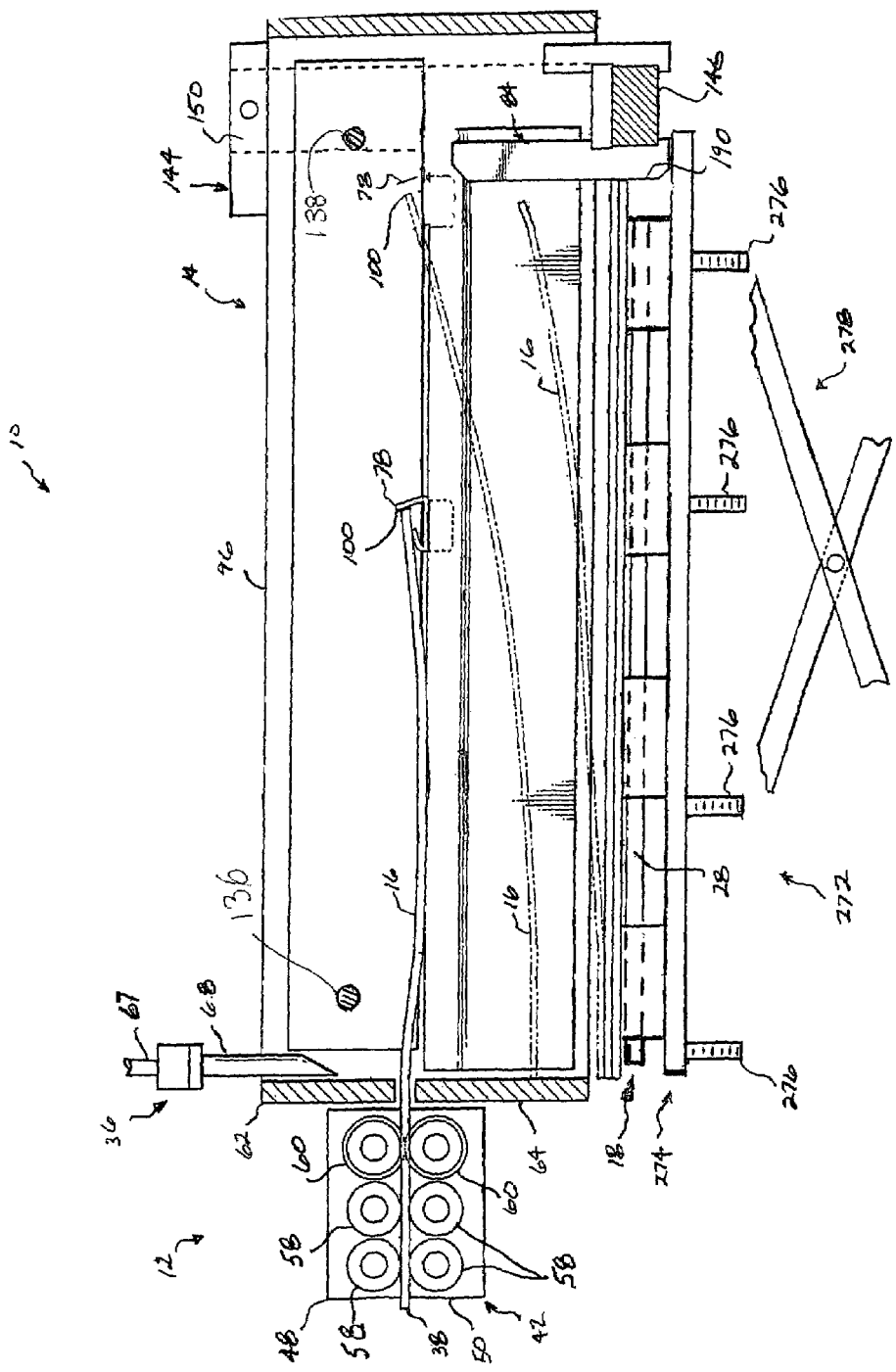
FIG. 2 is a side view of the stacking system FIG. 1.
Figure 3:
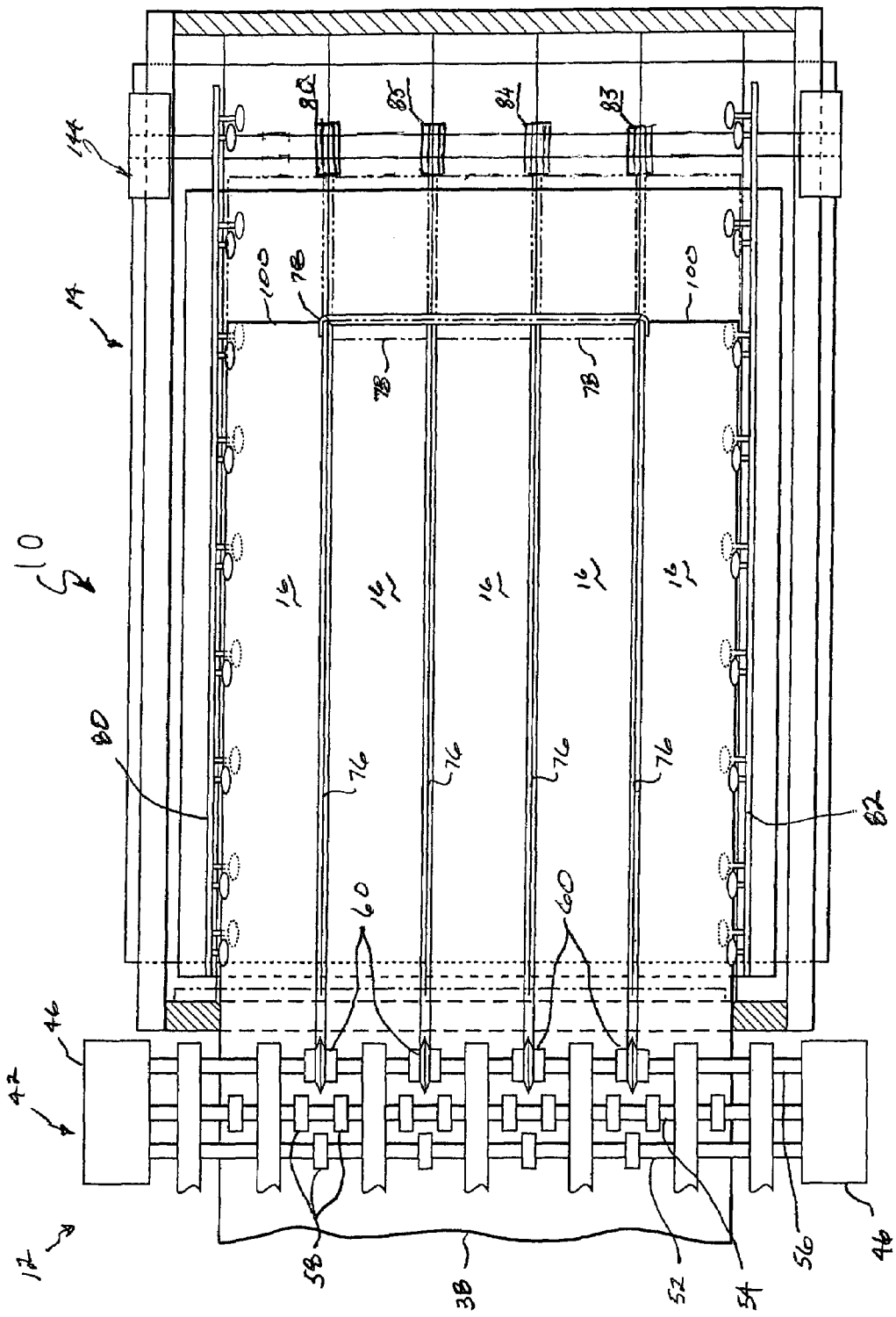
FIG. 3 is a top view of the stacking system FIG. 1.

Referring now to FIGS. 1-3, a stacking system 10 for stacking a plurality of metal sheets in accordance with an exemplary embodiment is provided. Stacking system 10 includes a blanking machine 12, a stacking mechanism 14, a plurality of stacks of severed sheets 16, and a skid 18 configured to receive stacks of sheets 16. Skid 18 includes a plurality of support members 20, 22, 24, 26 and connecting members 28, 30.

A brief explanation of the blanking machine 12 will now be provided. Reference is also made to U.S. patent application Ser. No. 10/872,328, filed Jun. 18, 2004, which is incorporated herein by reference thereto. Blanking machine 12 receives an uncut metal roll 34 for cutting into a plurality of smaller flat sheets 16. Blanking machine 12 includes a transverse cutter mechanism 36 for severing an unrolled sheet portion 38 in the transverse direction 40 and a longitudinal cutter mechanism 42 for severing sheets in the longitudinal direction 44. Longitudinal cutter mechanism 40 is configured to advance unrolled sheet portion 38 toward the stacking mechanism 14. Longitudinal cutter mechanism 42 is further configured to sever sheet portion 38 in the longitudinal direction 44 before the sheet portion 38 is severed by the transverse cutter mechanism 36. In particular, transverse cutter mechanism 36 severs sheet portion 38 in the transverse direction 40, forming sheet 16 having dimensions smaller in the transverse and longitudinal directions 40, 44 compared to uncut sheet portion 38. Severed sheet 16 is then urged toward the stacking mechanism 14 by sheet portion 38 being advanced in the longitudinal direction 44 by longitudinal cutter mechanism 42.

As shown in FIGS. 2 and 3, longitudinal cutter mechanism 42 includes a gear transmission drive 46, an upper roller and cutter assembly 48, and a lower roller and cutter assembly 50. Upper roller and cutter assembly 48 and lower roller and cutter assembly 50 each include three parallel spaced drive shafts 52, 54, 56, a plurality of drive rollers 58, and a plurality of rotating cutters 60. Gear transmission drive 46 provides power to rotate drive shafts 52, 54, 56 thereby rotating drive rollers 58 and rotating cutters 60. Drive rollers 58 are spaced along the lengths of drive shafts 52, 54. Rotating cutters 60 are spaced along the length of drive shaft 56. The positions of drive rollers 58 and rotating cutters 60 disposed along the lengths of drive shafts 52, 54, 56 can be configured to suit the width in the transverse direction 40 of sheets 16 to be severed in blanking machine 12.

Referring to FIGS. 1-3, transverse cutter mechanism 36 includes an upper guide plate 62, a lower guide plate 64, reciprocating drive shafts 66, 67 and a shearing blade 68. Upper guide plate 62 and lower guide plate 64 are disposed proximate rotating cutters 60 of longitudinal cutter mechanism 42. Upper and lower guide plates 62, 64 are spaced apart in a manner to maintain sheet portion 38 in substantially the same plane as when the sheet portion 38 passes between the upper and lower roller and cutter assemblies 48, 50. Shearing blade 68 is disposed proximate upper guide plate 62 and cuts sheet portion 38 in the transverse direction 40 as shearing blade 68 is urged downward by reciprocating drive shaft 66. Reciprocating drive shafts 66, 67 are configured to urge shearing blade 68 in an up and down motion. Upper guide plate 62 is configured to maintain shearing blade 68 in substantially a single plane as shearing blade 68 moves downward to sever sheet portion 38, to form sheets 16. Sheets 16 are then urged toward stacking mechanism 14 by sheet portions 38 which are urged by drive rollers 58 of longitudinal cutter mechanism 42.

Stacking mechanism 14 is provided to guide sheets 16 coming from blanking machine 12 to skid 18 disposed below stacking mechanism 14. Stacking mechanism 14 includes a frame 74, a plurality of dividers 76, top guide 78, side-guides 80, 82, and a plurality of backstop members 83, 84, 85, 86, and 87. Dividers 76 are movably secured to the system such that the width therebetween can be varied to receive differently sized metal pieces.

FIG. 1 also shows that the unloader and stacking mechanism also includes a side-restraint or side guide system to help ensure that the severed sheets fall neatly onto the growing stack below on the pallet, by guiding and constraining the permissible location of the left and right outer edges of the severed sheets on the growing stack. The guide system includes the left and right longitudinally arranged side guide assemblies, and transversely arranged horizontal support rods or screws 136 and 138, on which side guides are slidably adjustable inwardly and outwardly. The side guide assemblies 80 and 82 respectively include elongated longitudinally arranged generally flat support plates and longitudinally arranged generally flat side guides hinged to hanging downwardly therefrom.

Frame 74 provides support for various guide apparatus attached to stacking mechanism 14. Guide apparatus such as dividers 76, top guide 78, side guides 80, 82, and backstop members 83, 84, 85, 86, and 87 are provided to guide sheets 16 to skid 18 in an manner to form ordered stacks of sheets 16 on top of skid 18.

Referring to FIG. 1, frame 74 includes four vertical support legs 88, transverse frame members 90, 92, and longitudinal frame members 94, 96. Transverse frame members 90, 92 and longitudinal frame members 94, 96 are configured to provide a substantially open rectangular shape for receiving sheets 16. Transverse and longitudinal frame members further provide support and attachment locations at which guide apparatuses can be attached.

Referring to FIG. 3, a plurality of dividers 76 are provided to guide the longitudinal edges of sheets 16 in a downward direction toward skid 18. Dividers 76 are elongated substantially thin flat metal strips disposed in the longitudinal direction 44 and spaced substantially parallel with respect to each other. The end portions of dividers 76 are configured to be coupled to transverse frame members 90, 92. The number of dividers 76 used and their placement along transverse frame members 90, 92 is based on the width of sheets 16 and the number of sheets 16 in the transverse direction 40. For example, two dividers 76 are disposed between side-guides 80, 82 for metal roll 34 that will be severed in the transverse direction 40 to form three sheets 16 where each sheet 16 has a substantially equal width in the transverse direction 40.

Figure 4:
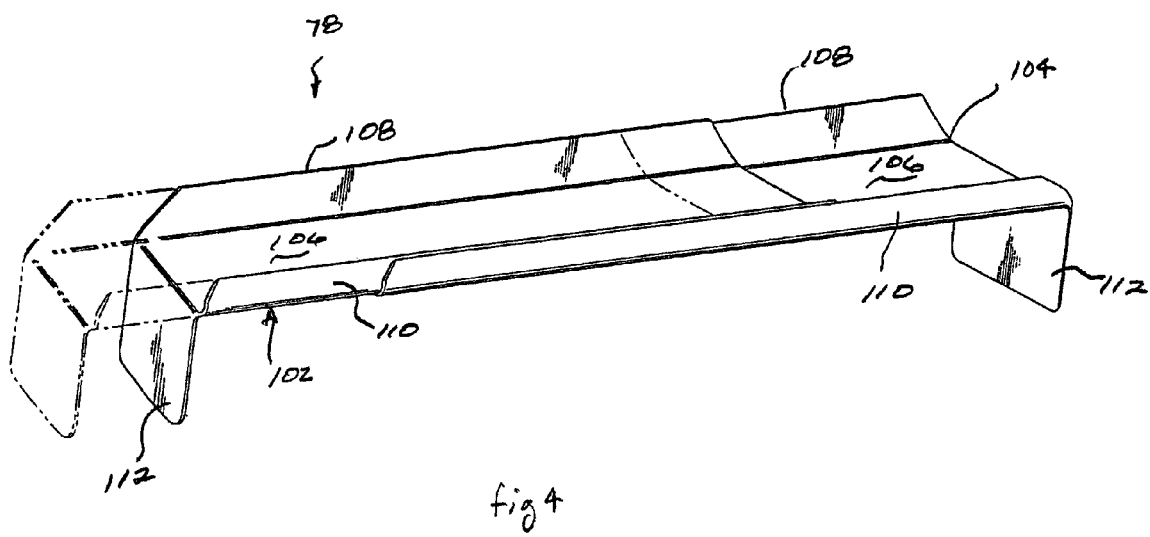
FIG. 4 is a perspective view of a top guide utilized in the stacking system of FIG. 2.
Figure 5:
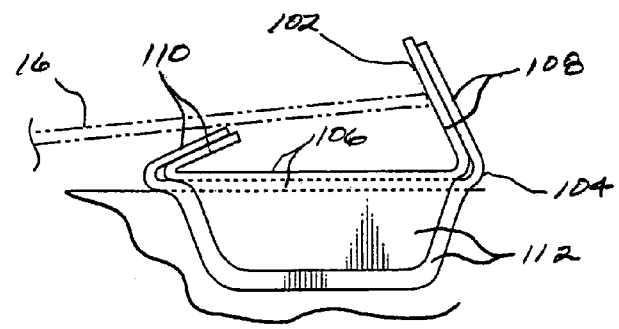
FIG. 5 is a side view of a portion of the top guide of FIG. 4 contacting a severed sheet.

Referring to FIGS. 2 and 4, top guide 78 is provided to maintain front edges 100 of sheets 16 in a substantially straight line with respect to each other as sheets 16 are being advanced toward backstop members 83, 84, 85, 86, and 87. Top guide 78 rests on the upper edges of dividers 76 in the transverse direction 40. In one non-limiting embodiment, top guide 78 includes telescoping portions 102, 104. Telescoping portions 102, 104 are configured to substantially slide against each other so the length of top guide 78 in the transverse direction 40 is adjustable. Portion 102 is substantially similar to portion 104, so only the details of portion 102 will be discussed.

Telescoping portion 102 includes a central wall 106, a rear wall 108, a front wall 110, and a sidewall 112. Central wall 106 is configured as an elongated, substantially planar member that rests on the upper edges of dividers 76. Rear wall 108 extends substantially the length of central wall 106. Rear wall 108 is further configured to angularly depend away from central wall 106 defining a substantially perpendicular angle, or an acute angle, between central wall 106 and rear wall 108. Front wall 110 extends substantially the length of central wall 106 and angularly depends away from central wall 106 in a direction to form a channel shape with respect to rear wall 108. Front wall 110 is further configured so that front wall 110 forms an acute angle with respect to central wall 106 that is substantially less than the angle between rear wall 108 and central wall 106. Sidewall 112 depends away from an end portion of central wall 106 that defines an angle between sidewall 112 and central wall 106 that is substantially perpendicular.

Referring to FIGS. 2-5, telescoping portions 102, 104 of top guide 78 are disposed on stacking mechanism 14 such that central wall 106 rests on the upper edges of dividers 76. Top guide 78 is initially placed on dividers 76 proximate blanking machine 12 at a location to receive front edges 100 of sheets 16. In particular, top guide 78 is disposed on dividers 76 such that sidewalls 112 of telescoping portions 102, 104 extend between dividers 76 toward skid 18 below stacking mechanism 14. Telescoping portions 102, 104 are further disposed on dividers 76 such that central wall 106 of telescoping portion 104 is disposed on central wall 106 of telescoping portion 102. Further, telescoping portion 104 nestles within telescoping portion 102 such that rear wall 108 of portion 104 substantially slides against rear wall 108 of portion 102. Similarly, front wall 110 of telescoping portion 104 substantially slides against front wall 110 of telescoping portion 102. To adjust the transverse 40 length of top guide 78, a user can first move telescoping portions 102, 104 upward until sidewalls 112 clear the upper edges of dividers 76. Thereafter, the user can slide telescoping portions 102, 104 along each other to a desired length. Thereafter, the user can lower telescoping portions 102, 104 of top guide 78 such that central walls 106 rest on dividers 76 and sidewalls 112 are in between dividers 76.

Top guide 78 is initially positioned on dividers 76 proximate blanking machine 12 so that the front portion of the initial sheets 16 coming off the blanking machine 12 contact top guide 78. Front edges 100 of sheets 16 contact an inside surface of rear wall 108 of top guide 78 and a bottom surface of sheets 16 contacts an upper portion of front wall 110. As sheets 16 are being urged from blanking machine 12, sheets 16 urge top guide 78 to slide along the upper edges of dividers 76 toward backstop members 83, 84, 85, 86, and 87. As sheets 16 are urged toward backstop members 83, 84, 85, 86, and 87, top guide 78 maintains front edges 100 of sheets 16 in a substantially straight line in the transverse direction 40. Thereafter, the front edges drop between the dividers before the backstop members.

Figure 4A:
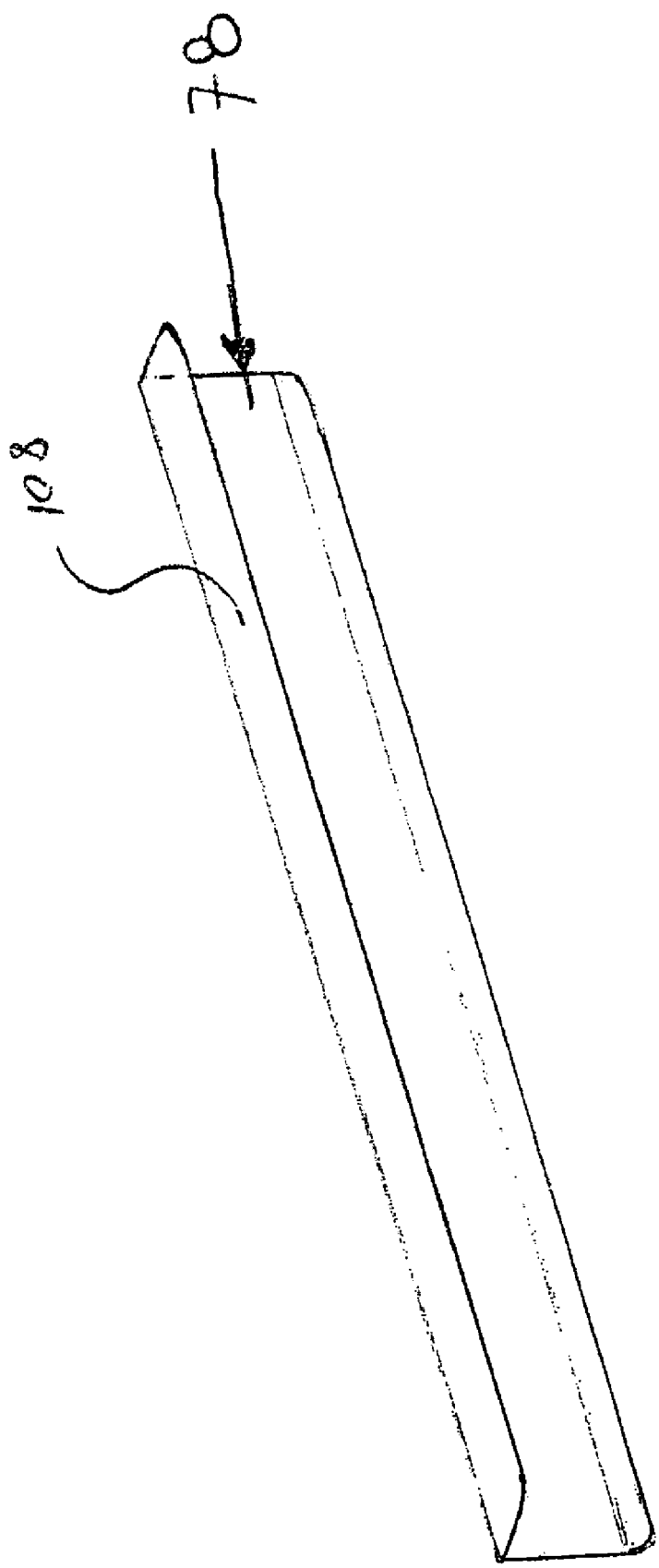
FIG. 4A is a perspective view of an alternative top guide utilized in the stacking system of FIG. 2.

In an alternative exemplary embodiment, top guide 78 comprises an "L" shaped member wherein an edge portion of top guide 78 provides a means for providing a stop for sheets 18. In one non-limiting exemplary embodiment, the top guide comprises a single unitary member. In this embodiment, there will be several pieces or top guides of different lengths for use as the widths of the sheets varies. One non-limiting example is shown in FIG. 4A.

Referring now to FIGS. 1-3, 6 and 7, side guides 80, 82 are provided to guide the outermost longitudinal edges 114 of sheets 16 as sheets 16 fall toward skid 18. Side-guides 80, 82 guide longitudinal edges 114 along substantially in a single plane with respect to each other as sheets 16 are being stacked on skid 18. Side guides 80, 82 are disposed within the interior of stacking mechanism 14, substantially parallel to longitudinal frame members 94, 96 respectively, and with a portion extending below dividers 76. The placement of side guides 80, 82 in stacking mechanism 14 in the transverse direction 40 corresponds substantially to the total transverse 40 length of the number of sheets 16 being guided by stacking mechanism 14. The configuration of side guide 80 within stacking mechanism 14 is substantially similar to that of side guide 82, therefore only the details of side guide 80 will be provided.

Side guide 80 includes a support member 120, a plurality of upper rollers 122, a plurality of lower rollers 124, and a guide support member 126. Support member 120 provides attachment locations for upper and lower rollers 122, 124 and guide support member 126. Support member 120 is an elongated rectangular member coupled to frame 74. In alternative embodiments, the configuration of support member 120 can include a plurality of members that when coupled together are substantially similar to the embodiment illustrated.

Upper rollers 122 and lower rollers 124 are used for a guiding process other than guiding sheets 16 to skid 18, therefore their function will not be discussed herein. Upper rollers 122 are spaced along and coupled to an elongated upper roller support member 128. Upper roller support member 128 is spaced apart from and coupled to an upper side portion of support member 120. Lower rollers 124 are spaced along and coupled to an elongated lower roller support member 130. Lower roller support member 130 is positioned substantially below upper roller support member 128. Lower roller support member 130 is coupled to upper roller support member 128 with a plurality of hinge members 132. Lower roller support member 130 rotates about hinge members 132 in a direction away from upper rollers 122 and toward support member 120. When stacking mechanism 14 is operating to guide sheets 16 toward skid 18, lower rollers 124 are rotated in a direction away from upper rollers 122 toward longitudinal frame member 96.

Guide support member 126 is configured to provide a surface to guide a portion of sheets 16 toward skid 18 during the operation of stacking mechanism 14. Guide support member 126 is further configured to include a surface to be contacted by a portion of skid 18 before any portion of skid 18 contacts dividers 76 when skid 18 is being positioned beneath dividers 76. Guide support member 126 is an elongated member extending substantially the length of support member 120. Guide support member 126 is disposed substantially beneath upper and lower rollers 122, 124 and beneath dividers 76. Guide support member 126 is coupled to support member 120 with a plurality of hinge members 134 so that guide support member 126 rotates in a direction away from lower rollers 124.

Figure 6:
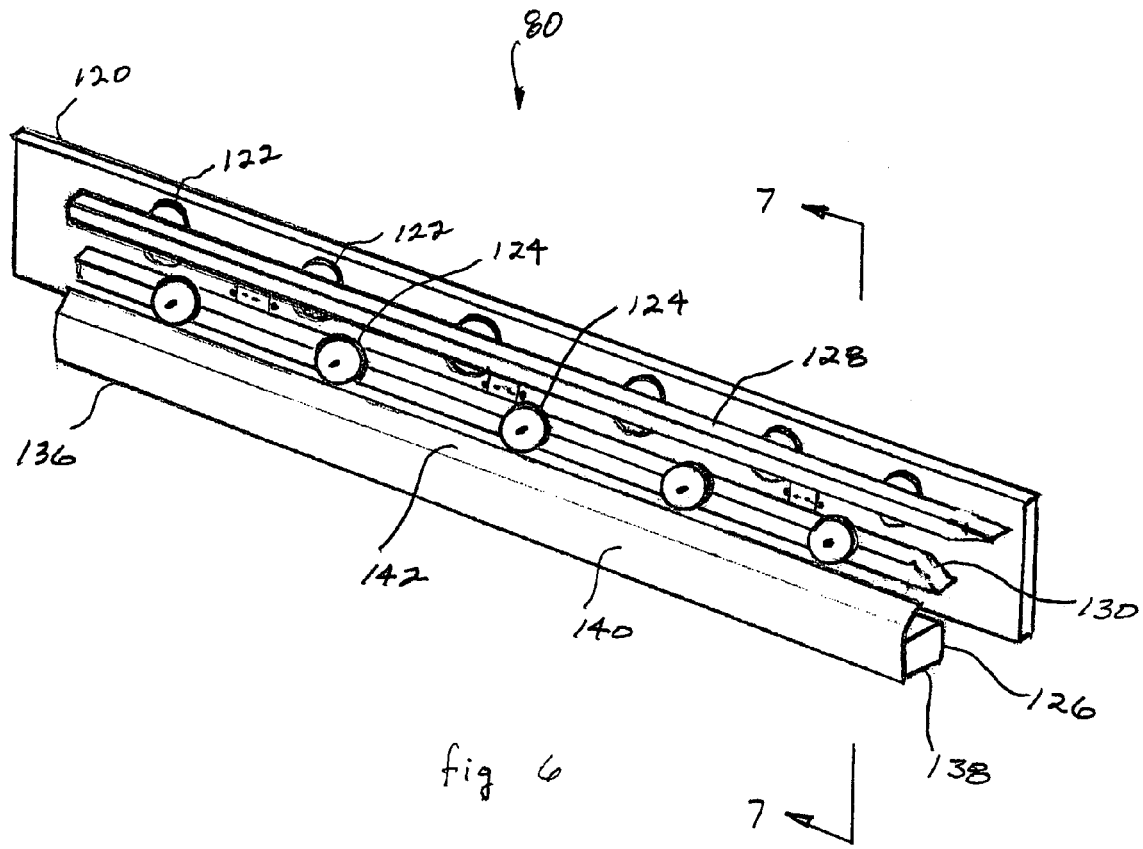
FIG. 6 is a perspective view of a side guide utilized in the stacking system of FIG. 1.
Figure 7:
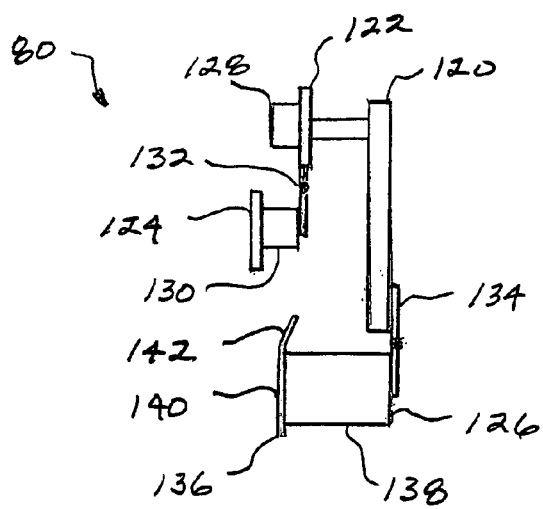
FIG. 7 is a cross sectional view of the side guide of FIG. 6 along lines 7-7.

Referring to FIGS. 6 and 7, guide support member 126 includes a workpiece contact member 136 and a skid contact surface 138. Workpiece contact member 136 includes a contact surface 140. Workpiece contact member 136 is an elongated member extending substantially along the length of and coupled to guide support member 126. Workpiece contact member 136 is coupled to a position on guide support member 126 that is substantially beneath lower rollers 124 when guide support member 126 is rotated to a position substantially below lower rollers 124. Guide support member 126 is configured to rotate toward a position where falling sheets 16 will deflect from contact surface 140 toward skid 18. Contact surface 140 is an elongated, substantially flat surface configured to be contacted by the longitudinal edges 114 of outboard most sheets 16 as sheets 16 fall toward skid 18.

Workpiece contact member 136 includes an upper flat portion 142 that angularly depends away from contact surface 140 toward the longitudinal frame member 96 when side guide 80 is coupled to transverse frame members 90, 92. Upper flat portion 142 is configured to deflect the longitudinal edges 114 of outboard most sheets 16 toward skid 18 along contact surface 140 if sheets 16 hit upper flat portion 142 of the workpiece contact member 136. Side guide 80 is further configured so that contact surface 140 of workpiece contact member 136 and upper flat portion 142 are substantially parallel to dividers 76 when side guide 80 is coupled to frame 74 in a position to guide longitudinal edges 114 of outboard most sheets 16. Alternative configurations of guide support member 126 include configurations where contact surface 140 or upper flat portion 142 are an integral portion of guide support member 126.

Skid contact surface 138 of guide support member 126 is positioned and configured to contact a portion of skid 18 as skid 18 is being positioned beneath stacking mechanism 14. In this embodiment, skid contact surface 138 is a surface of guide support member 126. Skid contact surface 138 is an elongated substantially flat surface disposed on a lower portion of guide support member 126. Guide support member 126 and skid contact surface 138 are further configured so that skid contact surface 138 contacts a portion of skid 18 before skid 18 would make contact with dividers 76 when skid 18 is being positioned beneath dividers 76, thereby avoiding damaging dividers 76 while positioning skid 18 beneath dividers 76. In essence, the length of the support members (20, 22, 24, 26) is greater than a width between the pair of side guides so that when the scissor lift is raised a surface of some of the plurality of extension members, typically located at the end portion, of the support members makes contact with a bottom surface of the side guides prior to other extension members (disposed in the inner portion of the support member) making contact with a bottom portion of the dividers. Moreover, the distance between each of the plurality of extension members no longer needs to be specifically modified as there is no requirement for the plurality of extension members to be received within each of the dividers in order to prevent damage of the same. In addition, there is no requirement for the support members to be readjusted as long as they are in position to contact a bottom portion of the side guides.

Referring to FIGS. 1-3 and 8, backstop members 83, 84, 85, 86, and 87 are provided for guiding front edges 100 of sheets 16 to skid 18 after sheets 16 are urged from blanking machine 12. Backstop members 83, 84, 85, 86, and 87 are supported and coupled to a backstop support member 144. Backstop support member 144 is configured to be coupled to longitudinal frame members 94, 96. The position of backstop support member 144 along longitudinal frame members 94, 96 corresponds to the longitudinal 44 length of sheets 16 being guiding by stacking mechanism 14.

Backstop support member 144 includes a horizontal bar member 146 and vertical bar members 148, 150. Horizontal bar member 146 is an elongated substantially rectangular shaped member extending in the transverse direction 40 between longitudinal frame members 94, 96 of stacking mechanism 14. Horizontal bar member 146 further includes an upper surface 152 configured to receive a portion of backstop members 83, 84, 85, 86, and 87. Each end portion of horizontal bar member 146 is configured to be coupled to a portion of vertical bar members 148, 150, respectively. Vertical bar members 148, 150 are each coupled to longitudinal frame member 94, 96, respectively.

Backstop members 83, 84, 85, 86, and 87 are configured to be disposed along a plurality of positions in the transverse direction 40 on upper surface 152 of horizontal bar member 146 of backstop support member 144. The position and number of backstop members 83, 84, 85, 86, and 87 used along backstop support member 144 corresponds to the transverse 40 length of sheets 16 being guiding by stacking mechanism 14. Backstop members 83, 84, 85, 86, and 87 are further configured to slidably receive divider 76 to secure backstop members 83, 84, 85, 86, and 87 from moving substantially in the transverse direction 40 while stacking mechanism 14 is in operation. Backstop member 84 is configured substantially similar to backstop members 83, 85, 86, and 87 therefore only the details of backstop member 84 will be discussed.

Figure 8:
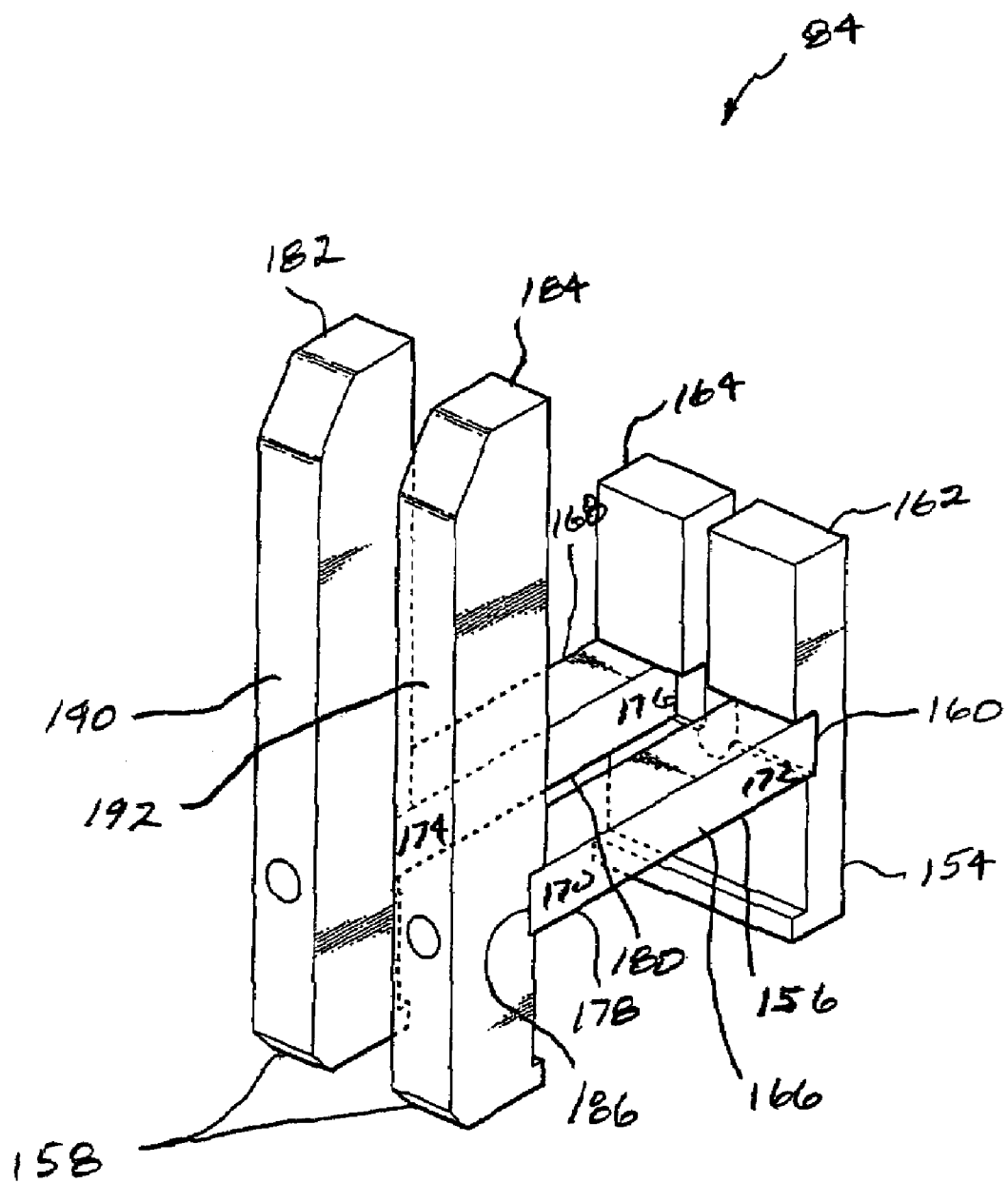

Referring to FIG. 8, an exemplary embodiment of backstop member 84 is illustrated. Backstop member 84 includes rear member 154, a central member 156, and a front member 158. As described in U.S. patent application Ser. No. 10/872,328 front member or members 158 are widened such that the front surface of front member 158 will be flush with a stacking surface as shown in FIGS. 18 and 19 of U.S. patent application Ser. No. 10/872,328. Rear member 154, central member 156, and front member 158 are configured to form an H-shaped configuration when coupled together. Rear member 154 includes a channel shaped groove 160 and spaced rear portions 162, 164 disposed above groove 160. Central member 156 includes two substantially parallel spaced bar shaped members 166, 168. Bar members 166, 168 have end portions 170, 172, 174, 176, respectively. Bar members 166, 168 each also have lower surfaces 178, 180 respectively, configured to be disposed on upper surface 152 of horizontal bar member 146 of backstop support member 144. End portions 170, 172 are configured to be coupled to groove 160 of rear member 154.

Front member 158 includes spaced front portions 182, 184. Each front portion 182, 184 includes a groove 186, 188, respectively, configured to be coupled to end portions 174, 176 of bar members 166, 168, respectively. Front portions 182, 184 each further include an elongated substantially flat surface 190, 192, respectively. Backstop member 84 is further configured so that flat surfaces 190, 192 share a substantially common plane where the plane is substantially perpendicular to a plane defined by lower surfaces 178, 180 of bar members 166, 168. Backstop member 84 is further configured so the space between front portions 182, 184 substantially aligns with the space between rear portions 162, 164. The aligned spaces permit divider 76 to be slidably received within the spaces when backstop member 84 is disposed on horizontal bar member 146.

Referring now to FIGS. 8A and 8B an alternative construction of a backstop member is illustrated. Here flat surface 190, 192 is provided by securing an extension member 193 to the backstop member in order to extend surface 190 and 192 down past the recessed area 195 shown in FIG. 8B. Thus, a uniform front surface of front member will be flush with a stacking surface as shown in FIGS. 18 and 19 of U.S. patent application Ser. No. 10/872,328. In addition, the width of extension member 193 may also be increased to be greater than the width of the backstop member to which extension member 193 is secured.

During cutting of an order, sheets 16 are guided by dividers 76, top guide 78, side guides 80, 82, and backstop members 83, 84, 85, 86, and 87 to form stacks of a plurality of sheets 16 on skid 18 in an orderly fashion. Ordered stacks of sheets 16 means transverse edges of sheets 16 align substantially in a single plane and longitudinal edges of sheets 16 align substantially in a single plane on skid 18.

Referring to FIGS. 1 and 9-11, skid 18 is provided for supporting a plurality of metal sheets 16. Skid 18 includes a plurality of support members 20, 22, 24, 26 and connecting members 28, 30. It should be noted that the illustrated configuration of skid 18 is one contemplated configuration and exemplary embodiments of the present invention are intended to cover the illustrated and other configurations. Support members can be configured to permit a user to form a skid 18 to suit the configuration of materials to be stacked on the support member or skid 18. Configurations include using one support member sized to receive stackable materials, or a plurality of support members used to form a skid to stack materials on the support members.

Referring to FIGS. 9-11, support members 20, 22, 24, 26 of skid 18 are disposed in a substantially parallel spaced relationship with respect to each other although this is not absolutely necessary as there can be some misalignment as the support members do not have studs that need to be received within the dividers and/or side guides. Connecting members 28, 30 are provided to maintain the spaced relationship of support members 20, 22, 24, 26 with respect to each other. Each of support members 20, 22, 24, 26 has a substantially similar configuration, therefore just the details of support member 20 will be discussed in further detail.

Figure 12:
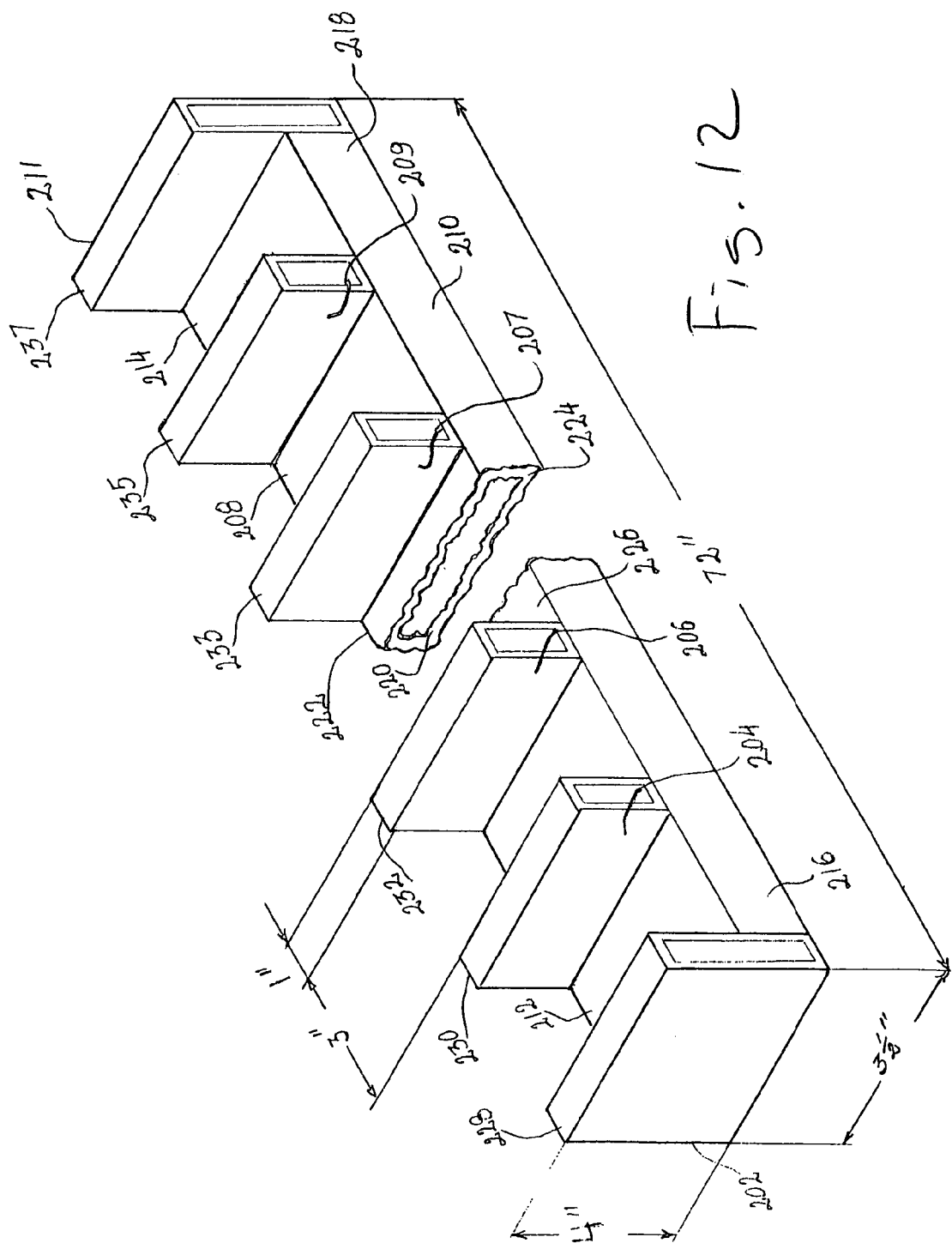
FIG. 12 is a perspective view of a support member utilized in the skid of FIG. 9 in accordance with an exemplary embodiment.

Referring to FIG. 12, support member 20 includes a base member 200, and a plurality of extension members 202, 204, 206, 207, 209, and 211. Of course, the number size and configuration of the extension members may vary. For example, it should be noted that support member 20 may include more extension members of a substantially similar configuration than those shown in FIG. 12. Support member 20 can be constructed of any hard material such as wood, plastic, or metal. In an exemplary embodiment, each support member comprises a base member 200, which in one non-limiting embodiment comprises an elongated tube member. Each tube member includes end portions, which will have a complimentary extension member depending therefrom, and each tube member will comprise a lower surface 220 and upper surface 222. In a non-limiting exemplary embodiment each extension member is substantially a planar shaped member having an upper surface 228, 230, 232, 233, 235, and 237, respectively. In the illustrated embodiment of FIG. 12, extension member 202 is coupled to one end portion and extension member 211 is coupled to the other end portion. Extension members 204, 206, 207, and 209 are spaced along and coupled to the upper surface of the tube member. Extension members 202, 204, 206, 207, 209, and 211 are configured so that all upper surfaces 228, 230, 232, 233, 235, 237 define a substantially single plane that is substantially parallel to a plane defined by the lower surfaces 220 of tube members, respectively. It is intended that when two or more support members are used to form skid 18, materials will be disposed on the upper surfaces of several or on all upper surfaces 228, 230, 232, 233, 235, 237 of extension members 202, 204, 206, 207, 209 and 211, respectively. The configurations of base member 200 and extension members 202, 204, 206, 207, 209, and 211 can vary from that illustrated so long as the relationships among the upper and lower surfaces remain as described. Additionally, it is intended that support members 20, 22, 24, 26 can be formed with the use of fasteners or welded connections. Also, an alternative embodiment could include support members 20, 22, 24, 26 where each member is a mold having a configuration that is substantially similar as that illustrated in FIG. 12.

It should be noted that sheets 16 stacked on upper surfaces 228, 230, 232, 233, 235, 237 of support member 20 can be banded to each other by banding between extension members 202, 204, 206, 207, 209 and 211 and then around sheets 16.

Referring to FIGS. 9-11, support members 20, 22, 24, 26 of skid 18 are maintained in a parallel relationship with connecting members 28, 30. Connecting members 28, 30 also prevent any support member from moving with respect to the other support members in a direction along the length of the base members assuming at least one support member is substantially in a fixed position. Connecting member 28 is configured as an elongated tube member having end portions 256, 258. Connecting member 30 is also configured as an elongated tube member having end portions 260, 262, as illustrated in FIG. 12. Connecting members can be solid, hollow members, or circular in shape.

Referring to FIG. 9, skid 18 is formed by positioning support members 20, 22, 24, 26 in a substantially parallel spaced relationship with respect to each other and then disposing connecting members 28, 30 on the support members. Specifically, once support members 20, 22, 24, 26 are positioned, end portion 256 of connecting member 28 is disposed on upper surface 222 of base member 200 between end extension member 202 and adjacent extension member 206 of support member 20. End portion 258 of connecting member 28 is then disposed on the upper surface of base member between the end extension member and the adjacent extension member of spaced support member 26.

An intermediate portion of connecting member 28 is disposed on the upper surfaces of respective base members of support members 22, 24. In a similar fashion, connecting member 30 is disposed on the upper surfaces of base members between adjacent extension members distal connecting member 28. It should be noted that connecting member 28 or 30 can be spaced apart and disposed on the upper surface of base member between any two extension members of any support members 20, 22, 24, 26. Additionally, due to tolerances of members, some connecting members 28, 30 may not contact an upper surface of base members.

Because support members 20, 22, 24, 26 have a relatively low weight, they can be easily positioned under the stacking mechanism 14 with respect to side guides 80, 82 and backstop members 83, 84, 85, 86, and 87.

Referring to FIGS. 9-11, a method of assembling skid 18 will now be described. The method includes positioning support members 20, 22, 24, 26 in a substantially parallel spaced relationship with respect to each other. The method further includes disposing connecting member 28 on the upper surfaces of the base members such that the connecting member connects support members 20, 22, 24, 26 to maintain their substantially parallel spaced relationship with respect to each other. The method further includes disposing connecting member 30 on the upper surfaces of base members distal connecting member 28 such that it connects support members 20, 22, 24, 26. Skid 18 can be easily separated by just removing connecting members 28, 30 from support members 20, 22, 24, 26. In an alternative embodiment, skid 18 can have a permanent configuration by fixedly coupling (fasteners, welding, etc.) connecting members 28, 30 to the support members 20, 22, 24, 26.

Using the above described method, a user can assemble many configurations of skid 18 depending on the length of support members and the number of support members connected by connecting members. Further, skid 18 is easily separated and support members 20, 22, 24, 26 store easier than a conventional configured pallet. Additionally, skid 18 described above is less costly to repair or replace compared to conventional pallets having a fixed configuration.

Figure 13:
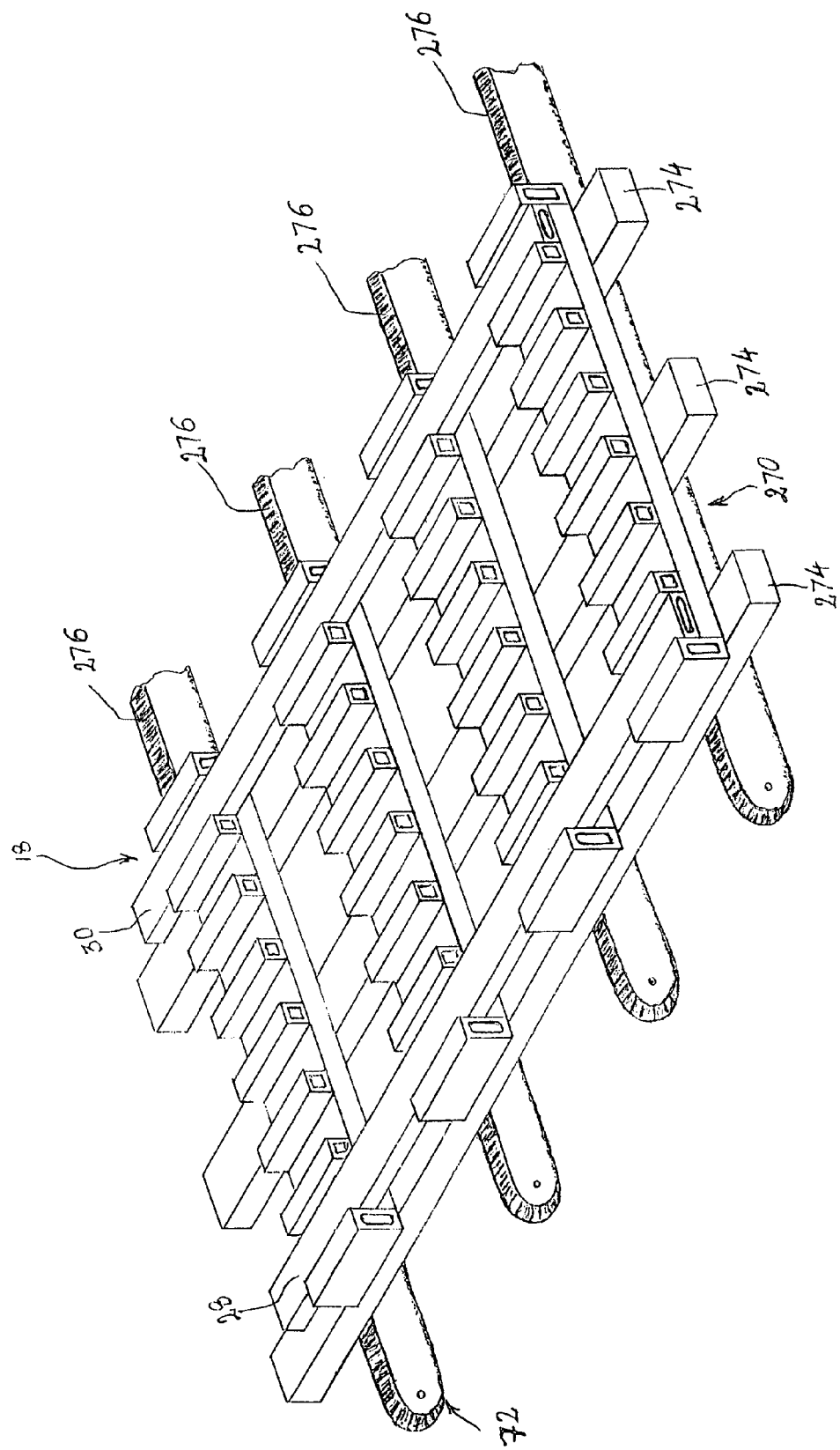
FIG. 13 is a perspective view of a skid on a chain stacker.

Referring to FIGS. 1, 2 and 13, a brief explanation of an exemplary embodiment of the present invention is provided. Initially, skid 18 is disposed on a platform 270 that is disposed on a chain stacker 272 proximate stacking mechanism 14. Platform 270 includes a plurality of substantially flat members 274 whose upper surfaces substantially define a plane. Chain stacker 272 includes a plurality of chains 276. Chains 276 are actuated simultaneously to position platform 270 and skid 18 beneath stacking mechanism 14 in the transverse direction 40. A scissors jack 278 coupled to chain stacker 272 moves chain stacker 272 in an upward direction to position skid 18 proximate the lowest edges of dividers 74 of stacking mechanism 14.

Skid 18 is positioned a relatively short distance beneath dividers 76 so sheets 16 fall a relatively short distance before landing on the upper surfaces 228, 230, 232, 233, 235, 237 of support members of skid 18. Sheets 16 that fall a small distance before landing on skid 18 are more likely to form orderly stacks of sheets 16 on skid 18. It is also desirable to avoid contacting dividers 76 with skid 18 when positioning skid 18 beneath dividers 76 to avoid damaging dividers 76. Side guides 80, 82 are configured to aid in positioning skid 18 close to dividers 76 without damaging dividers 76.

Figure 14:
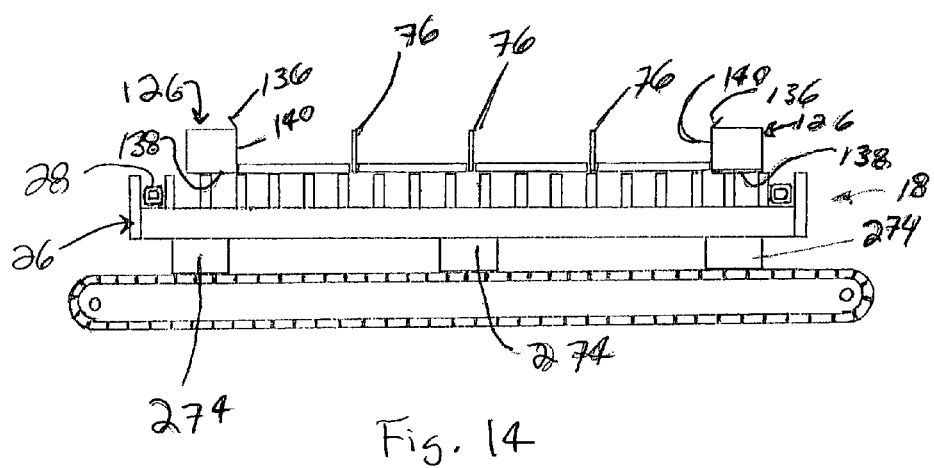
FIG. 14 is a side view of a skid in a transverse direction positioned relative to dividers and side guides of the stacking system of FIG. 2.

Referring to FIG. 14, as skid 18 is moved toward dividers 76 by scissors jack 278, a portion of skid 18 is intended to contact skid contact surface 138 of side guides 80, 82 before skid 18 contacts dividers 76. Thus, damage of the dividers is prevented. Side guides 80, 82 are positioned adjacent to dividers 76 of stacking mechanism 14 so the transverse distance between contact surfaces 140 of workpiece members 136 of side guides 80, 82 substantially corresponds to the total transverse width of sheets 16 severed in blanking machine 12. A user can use scissors jack 278 to urge skid 18 to a position close to dividers 76, then adjust the transverse position of skid 18 to ensure skid contact surface 138 contacts skid 18 before a portion of skid 18 contacts dividers 76.

Stacks of sheets 16 are formed on skid 18 as they are guided from blanking machine 12 by stacking mechanism 14 to skid 18. As the stack height increases, scissors jack 278 is used to lower skid 18 to receive additional sheets 16. When the stacks of sheets 16 reach a predetermined height, scissors jack 278 and chain stacker 272 move skid 18 away from stacking mechanism 14 so sheets 16 can be banded together.

Figure 16:
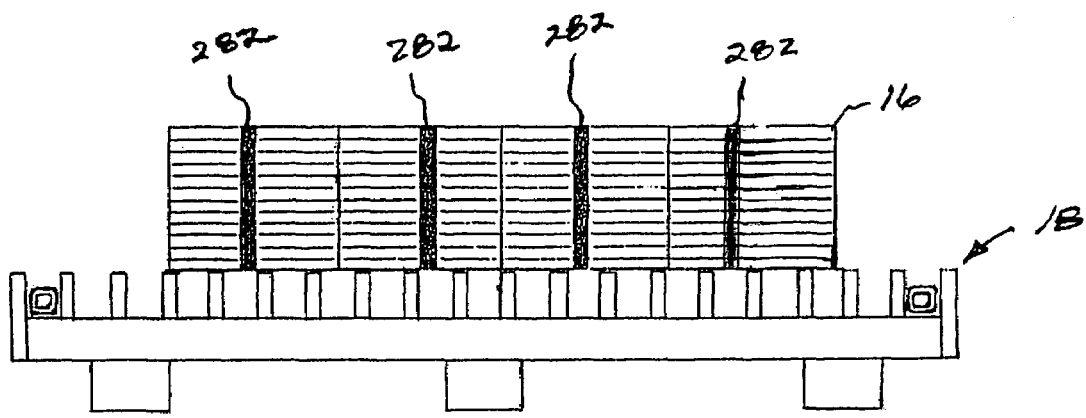
FIG. 16 is a side view of a skid holding a plurality of sheets thereon.

Referring to FIG. 16, stacks of sheets 16 banded together in the longitudinal direction 44 is illustrated. Banding stacks of sheets 16 entails wrapping a stack of sheets 16 tightly together with relatively thin metallic or plastic straps or bands 282.

Figure 17:
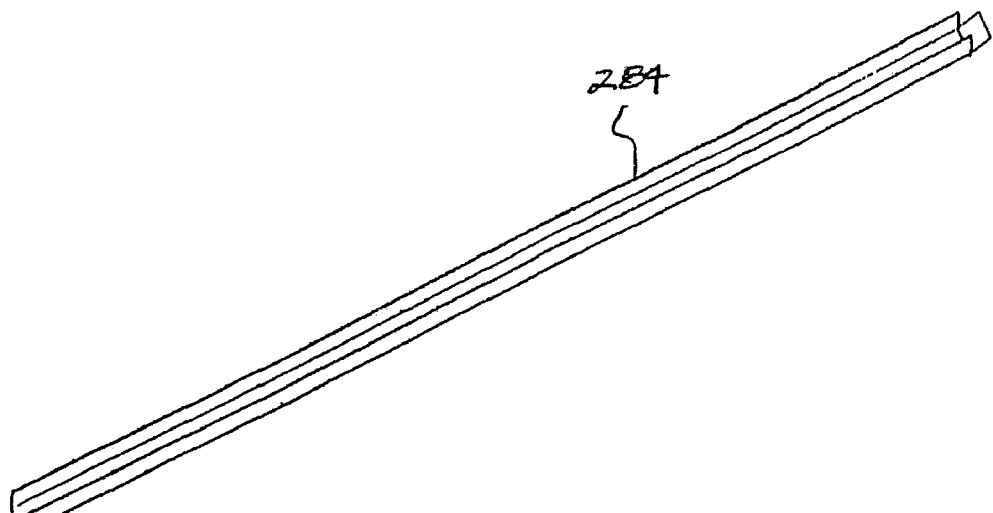
FIG. 17 is a perspective view of a banding tool used to band together a plurality of sheets between the support members of the skid of FIG. 15.

In order to band the stacks of sheets together a banding tool 284 is slid through the openings between the extension members under the stacks of sheets. One exemplary embodiment of banding tool 284 is shown in FIG. 17. The banding tool is used to allow a banding material to be slid from one end of the stack across to another end of the stack. Thereafter, the ends of the banding material, which are at opposite ends of the stack can be secured to each other at the top of the stack in accordance with known methods of strap securement.

By using a banding tool 284 in accordance with an exemplary embodiment of the present invention, strapping 282 can be inserted underneath the stacks between extension members 206 of support members 20, 22, 24, 26 of skid 18. The banding 282 is placed in and slid through the banding tool 284 and the banding is passed along the longitudinal length of sheets 16 and skid 18. The bands 282 are then tightened around sheets 16. In accordance with an exemplary embodiment, banding tool 284 can be made of sheet metal in a configuration as shown in FIG. 17.

Referring now to FIG. 18, stacks of sheets 16 banded together in the longitudinal direction is illustrated. After the stacks of sheets 16 are bound in the longitudinal direction, the stacks of sheets 16 are taken off skid 18 and disposed on transport members 286. The stacks typically are placed on transport members 286 such as wood or metal to keep sheets 16 from being damaged or contacting wet surfaces. Banding can then be applied in the transverse direction 40 to the stacks at multiple locations, as illustrated in FIG. 19.

As illustrated in FIG. 19, the banding can also be placed around transport members 286, wherein the transport members are secured to the stack.

Figure 15:
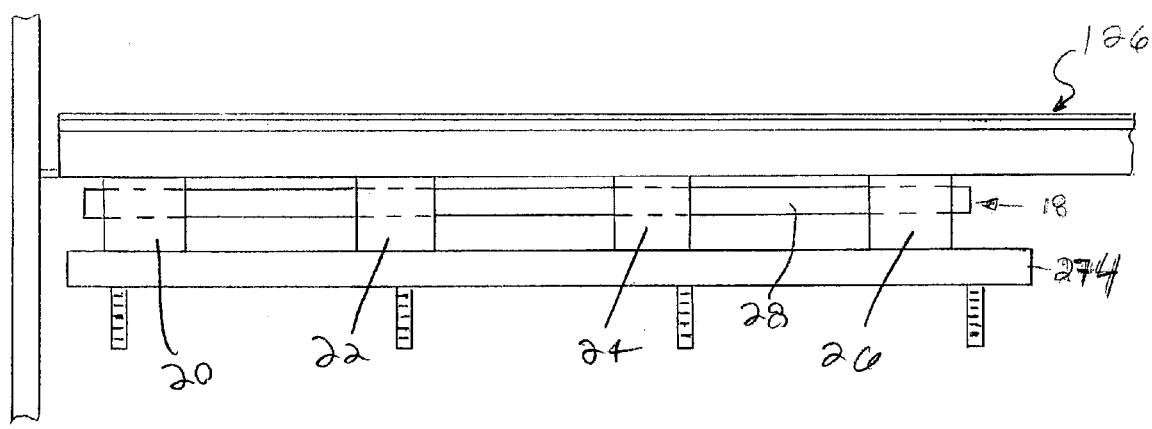
FIG. 15 is a side view of a portion of a skid in a longitudinal direction.

The skid and banding tool 284 allows any lengthwise band 282 to get through for any order (e.g., FIG. 16) and for many different sheet widths because the skid's base member posts (extension members 202, 204, 206, 207, 209 and 211) are 3 inches from each other (FIG. 12). When a process of staking starts, side guides cling to a skid forming one surface together with skid's dividers (FIGS. 14 and 15) wherein the first metal sheets are stacked correctly on the skid. As illustrated in FIG. 3, top guides (78) are used only to stack a few first sheets (16) on the skid. Thereafter, the metal sheets slide down one after another forming a neat full stack. In accordance with an exemplary embodiment, the skid can be made either of steel or aluminum.

The stacking system, skid, and method of assembling the skid provide a substantial advantage over stacking systems using conventional pallets. In particular, the skid is used with orders having varying sized (e.g., width) configurations wherein separately designed base members are not required as there is no need for the extension members of any portion of the skid to be received within areas defined by the dividers.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. It should also be noted that the terms "first", "second", "third", "fourth", "up", "down", "vertical", "longitudinal", and "transverse" and the like may be used herein to modify elements performing similar and/or analogous functions or provide orientation among the elements. These modifiers do not imply a spatial, sequential, or hierarchical order to the modified elements unless specifically stated.

What is claimed is:

1. A skid for supporting stackable workpieces, comprising:
at least a first support member and a second support member extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, the first and second plurality of extension members being configured to support workpieces thereon, wherein a length of the first support member and the second support base member is greater than a width between a pair of side guides of a stacking system; and
at least a first and a second connecting member extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members;
the first and second support members being movable relative to one another in the second direction while being guided by the first and second connecting members, wherein the first and second support members are configured to provide a universal receiving surface for use with a stacking system capable of providing items to be received on the receiving surface which vary in size.

2. The skid as in claim 1, wherein the first support member comprises a tubular member.

3. The skid as in claim 1, wherein the first support member has an aperture or groove configured for receiving a banding member for coupling the stacked workpieces to the skid.

4. The skid as in claim 1, wherein a plurality of surfaces defined by the first plurality of extension members generally define a plane that is substantially parallel to a plane defined by a third surface of the first base member.

5. The skid as in claim 1, wherein the first and second support members define a first receiving region having a first size when the first and second support members are disposed a first predetermined distance apart.

6. The skid as in claim 5, wherein the first and second support members define a second receiving region having a second size when the first and second support members are disposed a second predetermined distance apart, the second predetermined distance being greater than the first predetermined distance, the second size being greater than the first size.

7. A stacking system for stacking workpieces, comprising:
a stacking mechanism configured to guide stackable workpieces, the stacking mechanism having a top guide configured to align a front edge of the workpieces, a pair side guides and a plurality of adjustable dividers disposed between the pair of side guides, the pair of side guides and the plurality of dividers defining areas corresponding to a dimension of the stackable workpieces; and
a universal skid configured to be disposed beneath the stacking mechanism, the skid being configured for receiving the stackable workpieces from the stacking mechanism, the skid having at least a first and a second support member and at least a first and a second connecting member, the first and second support members extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, the first and second plurality of extension members being configured to support stackable workpieces thereon, the first and second connecting members extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members, the first and second support members being movable relative to one another in the second direction while being guided by the first and second connecting members, wherein a length of the first support member and the second support base member is greater than a width between the pair of side guides of the stacking mechanism, wherein the first and second support members are configured to provide a universal receiving surface for use with the stacking system and wherein the first and second support members will make contact with a lower surface of the side guides thereby preventing the first and second support members from contacting or damaging the dividers.

8. The stacking system of claim 7, wherein the top guide comprises first and second telescoping guide portions extending in a third direction, the first and second telescoping guide portions being configured to be adjustably disposed with respect to each other on the stacking mechanism, each first and second telescoping guide portion having a portion configured to contact the front edges of the stackable workpieces, wherein the front edges are aligned as the workpieces are guided by the stacking mechanism.

9. The stacking system of claim 7, wherein the first and second support members define a first receiving region having a first size when the first and second support members are disposed a first predetermined distance apart.

10. The stacking system of claim 9, wherein the first and second support members define a second receiving region having a second size when the first and second support members are disposed a second predetermined distance apart, the second predetermined distance being greater than the first predetermined distance, the second size being greater than the first size.

11. A stacking system for stacking workpieces, comprising:
a stacking mechanism configured to guide stackable workpieces, the stacking mechanism having a pair of side guides, each being configured to align a side edge of at least one of the workpieces; and
a skid disposed beneath the stacking mechanism, the skid being configured for receiving the stackable workpieces from the stacking mechanism, the skid having at least a first and a second support member and at least a first and a second connecting member, the first and second support members extending generally in a first direction in a substantially parallel spaced relationship with respect to one another, the first support member having a first base member and a first plurality of extension members extending from a first surface of the first base member, the second support member having a second base member and a second plurality of extension members extending from a second surface of the second base member, the first and second plurality of extension members being configured to support stackable workpieces thereon, the first and second connecting members extending generally in a second direction substantially perpendicular to the first direction, the first connecting member having first and second end portions, the first end portion being disposed on the first surface of the first base member between adjacent extension members of the first plurality of extension members, the second end portion being disposed on the second surface of the second base member between adjacent extension members of the second plurality of extension members, the second connecting member having third and fourth end portions, the third end portion being disposed on the first surface of the first base member between adjacent extension members of the first plurality of extension members, the fourth end portion being disposed on the second surface of the second base member between adjacent extension members of the second plurality of extension members, the first and second support members being movable relative to one another in the second direction while being guided by the first and second connecting members and wherein a length of the first support member and the second support member is greater than a width between the pair of side guides of the stacking system and the first support member and the second support member will contact the pair of side guides as opposed to contacting a plurality of dividers disposed above the first support member and the second support member.

12. The stacking system of claim 11, wherein the side guide comprises a support member, a workpiece contact member, and a skid contact surface, the support member extending in a third direction and being configured to be adjustably disposed on the stacking mechanism, the workpiece contact member coupled to the support member, the workpiece contact member having a substantially flat elongated contact surface substantially parallel to the third direction, the contact surface being configured to contact the side edge of the workpiece being guided by the stacking mechanism to the skid, the skid contact surface being disposed proximate the workpiece contact member, the skid contact surface being configured to aid in positioning the skid beneath the stacking mechanism wherein the skid contact surface contacts a portion of the side guide when the skid is being positioned beneath the stacking mechanism.

13. The stacking system of claim 11, wherein the first and second support members define a first receiving region having a first size when the first and second support members are disposed a first predetermined distance apart.

14. The stacking system of claim 13, wherein the first and second support members define a second receiving region having a second size when the first and second support members are disposed a second predetermined distance apart, the second predetermined distance being greater than the first predetermined distance, the second size being greater than the first size.

15. The stacking system as in claim 11, further comprising: a backstop member configured to align an edge of the workpieces.

16. The stacking system of claim 15, wherein the backstop member is further configured to be adjustably disposed on the stacking mechanism, the backstop member having a substantially flat elongated contact surface configured to contact the edge of the stackable workpiece, wherein the edge is aligned as the workpiece is guided by the stacking mechanism to the skid.

17. The stacking system of claim 15, wherein the first and second support members define a first receiving region having a first size when the first and second support members are disposed a first predetermined distance apart.

18. The stacking system of claim 17, wherein the first and second support members define a second receiving region having a second size when the first and second support members are disposed a second predetermined distance apart, the second predetermined distance being greater than the first predetermined distance, the second size being greater than the first size.

19. The stacking system of claim 15, wherein a portion of the first plurality of extension members contact the pair of side guides prior to another portion of the first plurality of extension members contacting a plurality of dividers disposed above the first support member and the second support member and a portion of the second plurality of extension members contact the pair of side guides prior to another portion of the second plurality of extension members contacting a plurality of dividers disposed above the first support member and the second support member.

* * * * *

UNITED STATES PATENT AND TRADEMARK OFFICE
CERTIFICATE OF CORRECTION

PATENT NO. : 7,594,458 B2 Page 1 of 1
APPLICATION NO. : 11/483392
DATED : September 29, 2009
INVENTOR(S) : Stanislaw J. Kozera It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Twenty-eighth Day of September, 2010

David J. Kappos
*Director of the United States Patent and Trademark Office*